(No Model.)  W. B. WOOD.  5 Sheets—Sheet 1.
THEATRICAL APPLIANCE FOR OPTICAL ILLUSIONS.
No. 415,084.  Patented Nov. 12, 1889.

Witnesses:
Wm. O. Stark
Centie S. Stark

Inventor:
Will B. Wood,
by Michael J. Stark,
Attorney.

(No Model.) 5 Sheets—Sheet 2.
W. B. WOOD.
THEATRICAL APPLIANCE FOR OPTICAL ILLUSIONS.
No. 415,084. Patented Nov. 12, 1889.
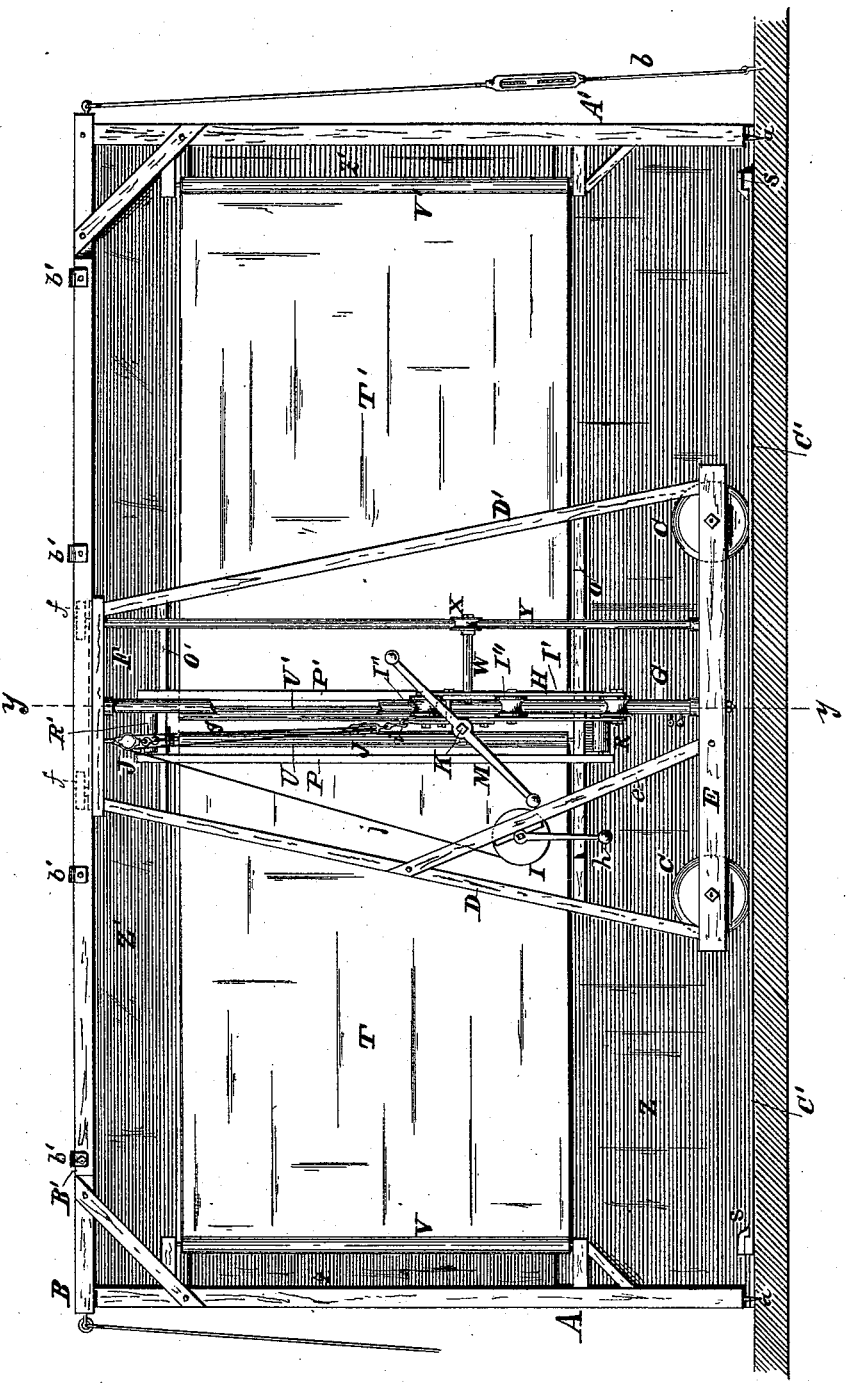
Witnesses:
Inventor:
Will B. Wood,
by Michael J. Stark,
Attorney.

(No Model.)   5 Sheets—Sheet 3.
W. B. WOOD.
THEATRICAL APPLIANCE FOR OPTICAL ILLUSIONS.
No. 415,084.   Patented Nov. 12, 1889.
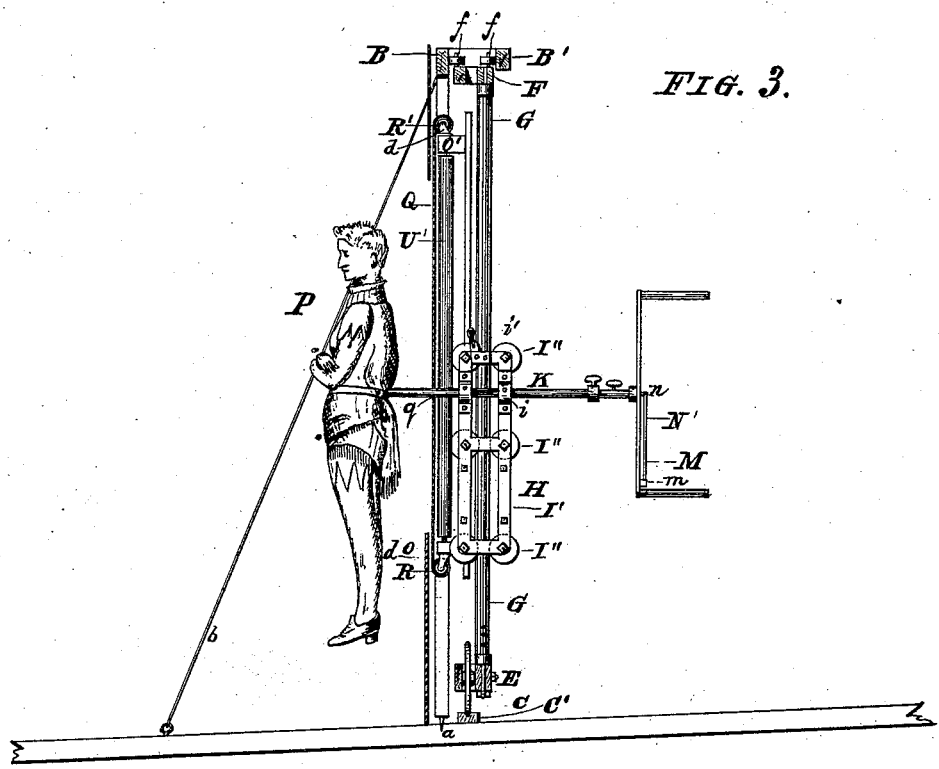
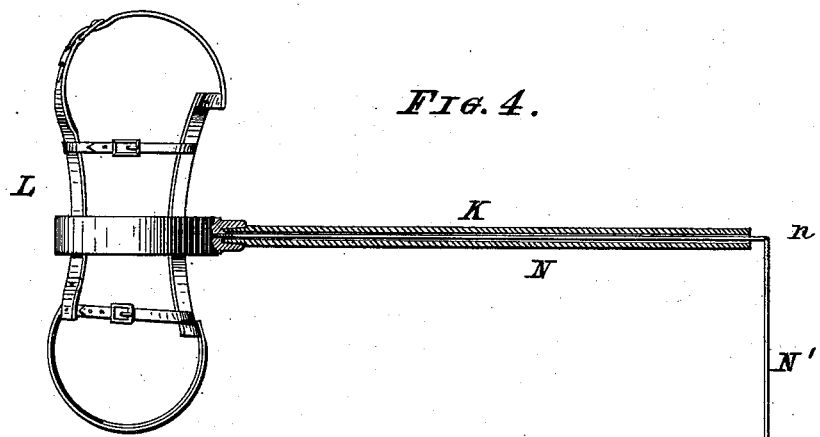
Witnesses:   Inventor:

(No Model.) 5 Sheets—Sheet 4.

W. B. WOOD.
THEATRICAL APPLIANCE FOR OPTICAL ILLUSIONS.

No. 415,084. Patented Nov. 12, 1889.

Witnesses:
Wm O Stark
Gentie S Stark

Inventor:
Will B Wood,
by Michael Stark,
Attorney.

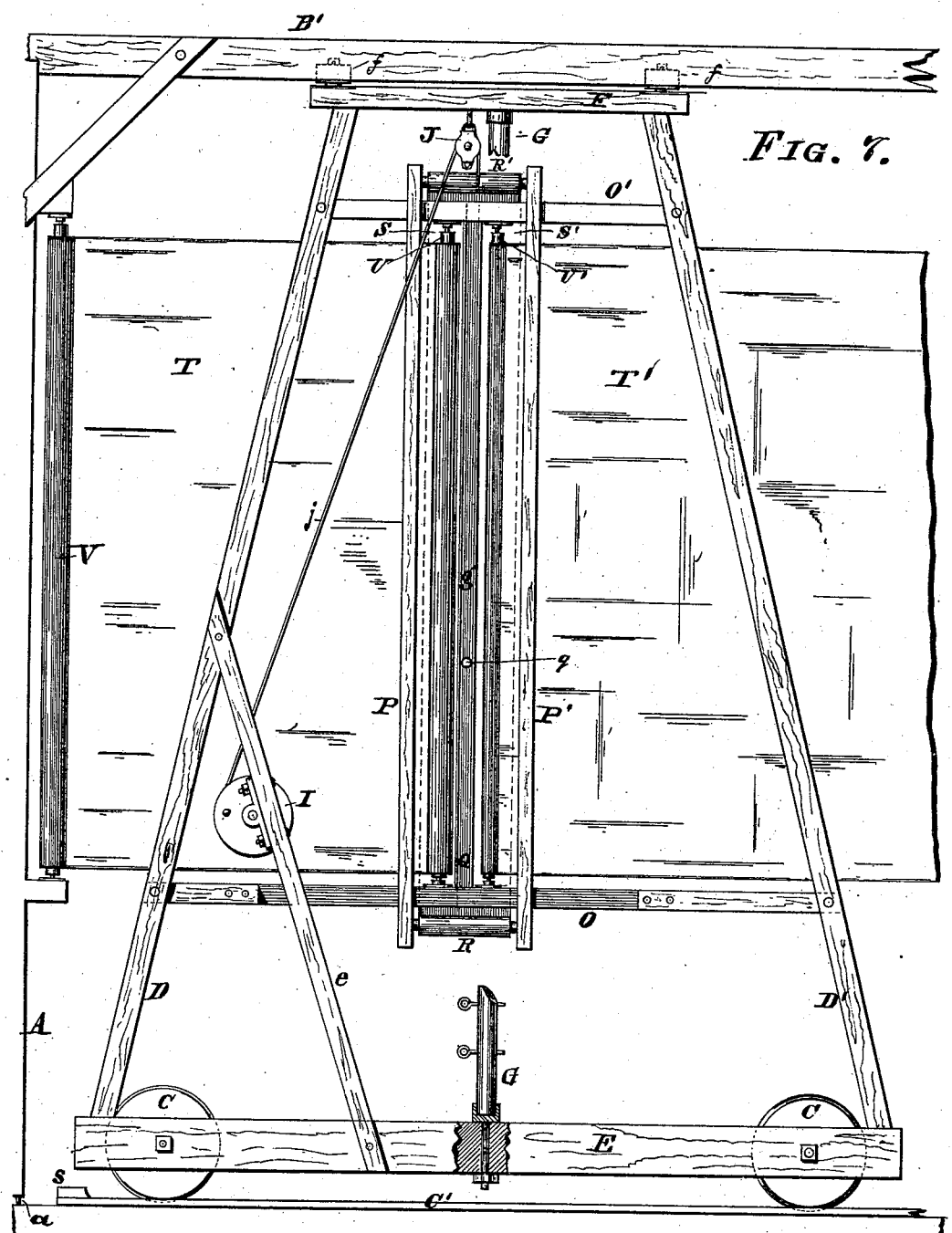

UNITED STATES PATENT OFFICE.

WILL B. WOOD, OF SHAMOKIN, PENNSYLVANIA.

THEATRICAL APPLIANCE FOR OPTICAL ILLUSIONS.

SPECIFICATION forming part of Letters Patent No. 415,084, dated November 12, 1889.

Application filed May 13, 1889. Serial No. 310,601. (No model.)

*To all whom it may concern:*

Be it known that I, WILL B. WOOD, of Shamokin, in the county of Northumberland and State of Pennsylvania, have invented certain new and useful Improvements in Devices for Suspending an Actor in Mid Air Without Visible Supports; and I do hereby declare that the following description of my said invention, taken in connection with the accompanying sheet of drawings, forms a full, clear, and exact specification, which will enable others skilled in the art to which it appertains to make and use the same.

This invention has general reference to devices for suspending an actor in mid-air without visible support; and it consists, essentially, in the novel and peculiar combination of parts and details of construction, as hereinafter to be first fully set forth and described, and then pointed out in the claims.

Figure 1:
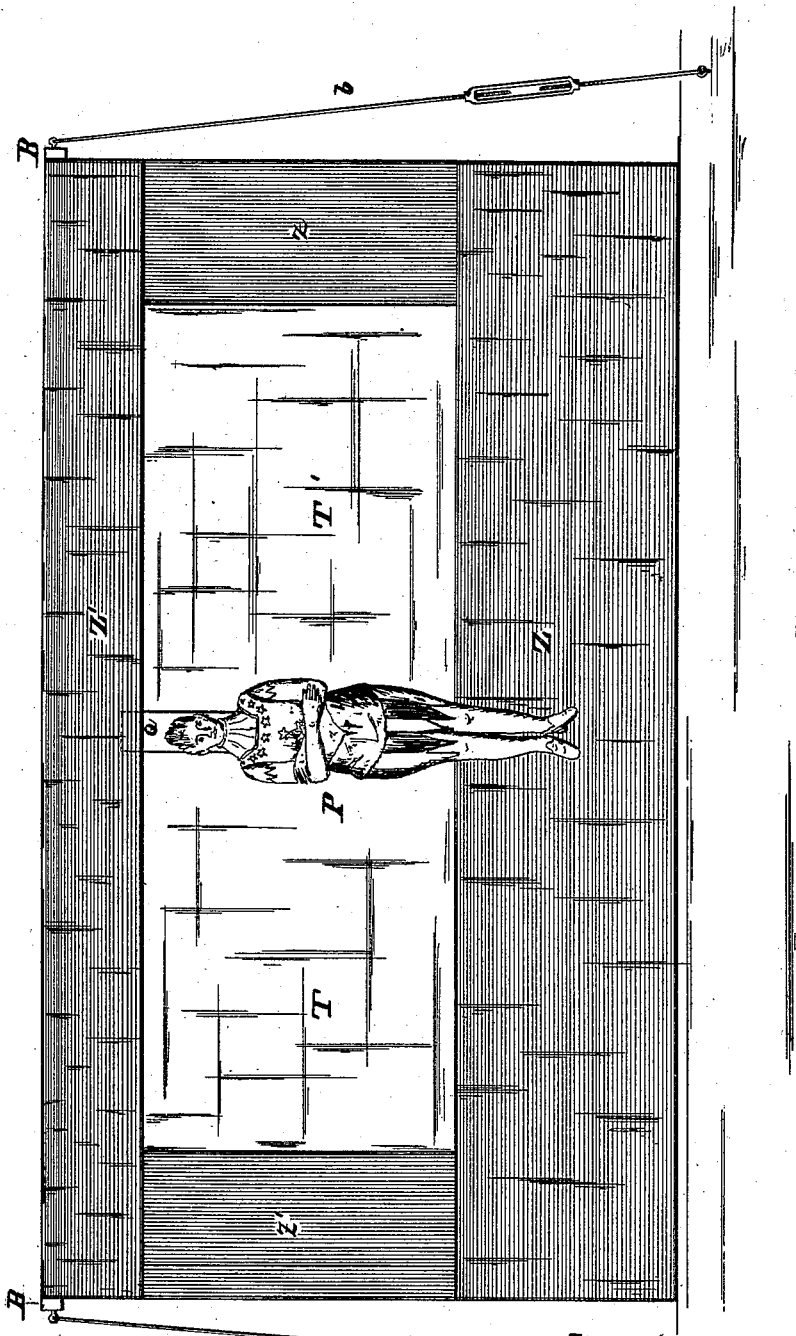
Figure 5:
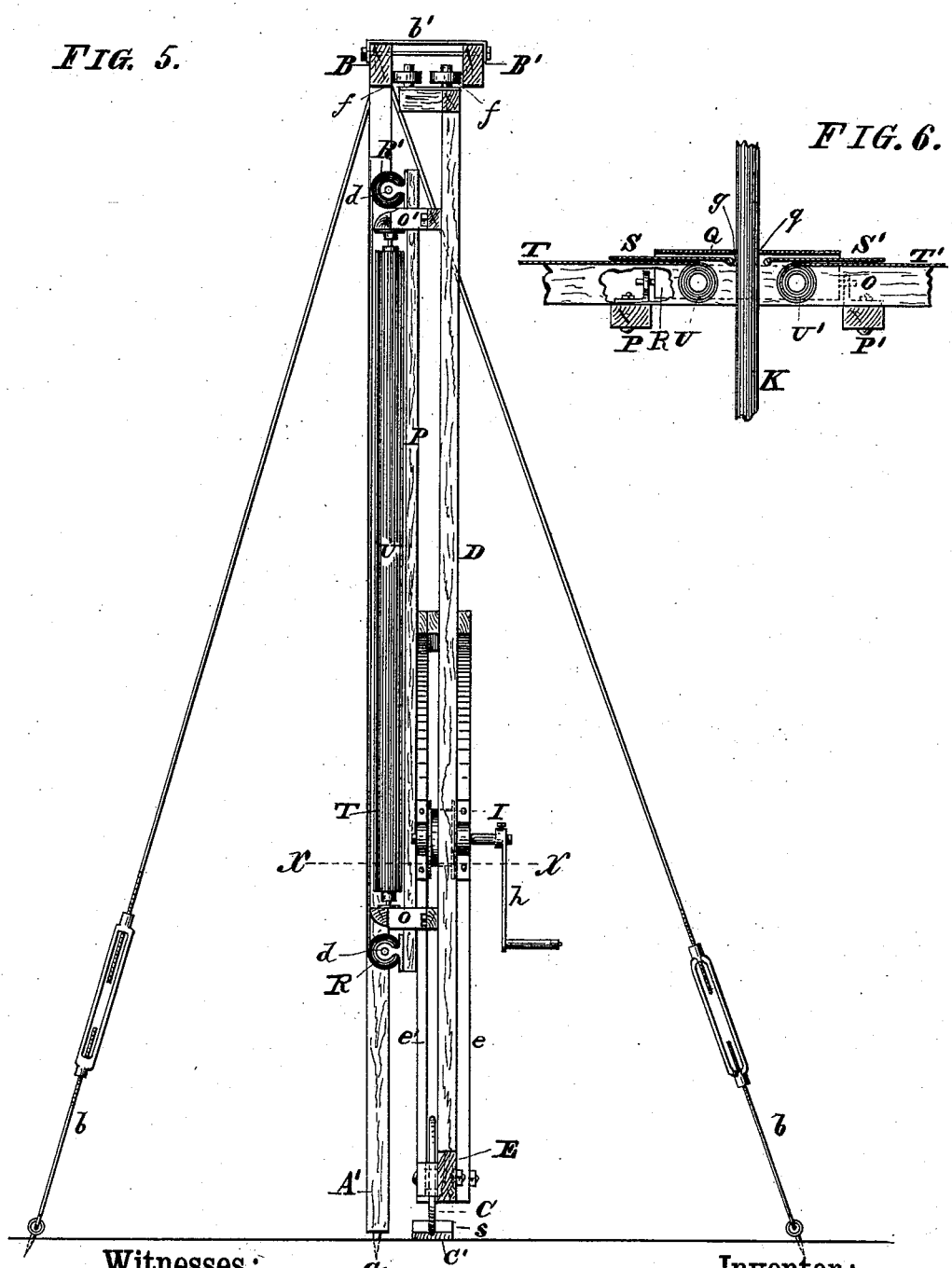
Figure 6:
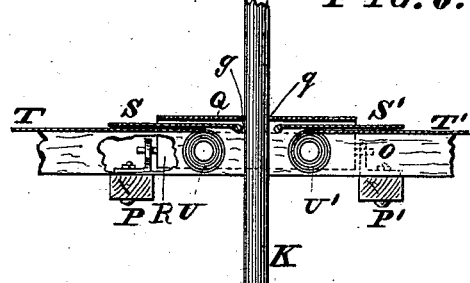

In the drawings already mentioned, which serve to illustrate my said invention more fully, Figure 1 is a front elevation of my device. Fig. 2 is a rear elevation of the same. Fig. 3 is a transverse sectional elevation in line *y y* of Fig. 2. Fig. 4 is a side elevation of the suspending-shaft and the metallic corset or frame worn by the actor in performing the act. Fig. 5 is a side elevation of the device, and Fig. 7 a rear elevation of the same, the elevating mechanism being omitted in these two figures to avoid crowding of the parts. Fig. 6 is a sectional plan in line *x x* of Fig. 5.

Like parts are designated by similar letters of reference in all the figures.

The object of this invention is the production of an efficient mechanism for producing the optical illusion of suspending an actor in mid-air and causing him or her to move and perform without visible support. This object I accomplish by constructing of or covering all the parts of my apparatus with black velvet or other non-reflecting material, so that though the performance may be carried on in full light of the stage the parts of the mechanism in front of the curtain cannot be seen on account of their color.

The principal frame of this apparatus consists of an inverted-U-shaped structure having two side members A A', connected on top by a rail B, said members A A' having spikes *a*, by means of which, and guy-rods *b*, provided with turn-buckles, as shown, they are securely erected upon the stage upon which the performance is to take place. To the top rail B is secured a back rail B', placed a suitable distance from said rail B and properly connected therewith by cross-pieces *b'*. Between these rails, and rolling upon wheels C, is placed an A frame or truck, consisting of two side bars D D', bottom rail E, and top rail F, a set of four guide-wheels *f*, placed onto the upper end of the A-truck, and wheels C, running in tracks C', keeping the A-frame always in its proper position.

Centrally within the A-frame is located a standard G, being a tube of proper size, upon which is located an elevating-truck H, raised and lowered by a winch I and a set of tackle-blocks and rope J, all as hereinafter to be described. The elevating-truck consists of two rectangular frames I', having six (more or less) grooved guide-wheels I'', suitably journaled in said frames I', and embracing the said standard G. To one of these sides are secured two bearings *i*, through which is passed a tubular spindle or shaft K, to the forward end of which the performer P is securely fastened and buckled by means of a frame or corset L, Fig. 4, which latter, being the subject-matter of a separate application for Letters Patent, filed May 13, 1889, Serial No. 310,602, I do not particularly describe, it being sufficient to say here that it consists of a metallic belt formed of two hinged sections, (to embrace the performer,) and provided with locking mechanism to close the belt after the performer has applied the same to his body, and suitable guards and straps so applied to said person that when the belt is fastened to the outer end of the shaft the performer may be elevated and revolved by said shaft K. To the inner end of the shaft K is secured a crank-handle M, by which it is revolved in its bearings *i*, and through the same is passed a rod N, having on its outer end a screw-thread engaging a female thread in the belt L, while to the inner end thereof is hinged (at *n*) an extension-rod N', the extreme end of which is held to the crank M by a catch *m* to prevent the rod N from turning, and thereby to disengage the belt from the rod, which might cause the actor to fall.

From the elevating-truck H projects a hook i', to which is secured the end of the tackle-block J, the rope j of which passes over the sheaves to the drum I of the winch, where the crank h enables the lifting of said truck in an obvious manner.

To the face of the A-frame are secured crosspieces O O', to receive vertical slats P P', to the top and bottom ends of which are secured, by suitable brackets d, Fig. 6, shade-rollers R R', over which a narrow curtain Q passes, it being understood that, the ratchet or locking mechanism of these so-called "spring shade-rollers" (the "Hartshorn," of well-known construction, being preferred) being removed, the curtain Q will wind and unwind upon and from these rollers, as it is raised or lowered at pleasure. In this curtain Q there is an opening q, Fig. 4, through which the spindle K passes.

To the face of the rails O O' are secured two metallic plates S S', to produce a slotted aperture g, in which the shaft K moves, said plates being located behind the curtain Q and faced toward the audience side with black velvet, this being also the material of which the curtain Q, as well as the two curtains T T', now to be described, are made. To the rails O O' are suitably journaled two vertical rollers U U', upon which the curtains T T' wind and unwind, there being on each outer end of these curtains further spring-rollers V V', Figs. 2 and 7, which latter rollers are used only in cases where the curtains T T' are so long that each cannot be entirely wound upon its respective roller U. When the rollers V V' are not used, the ends of the curtains T T' are suitably fastened to the uprights A A' of the main frame. The main frame is covered on its front side with black velvet drapery, there being used for this purpose the lower course Z, the upper course Z', and the two side pieces z z', respectively, the space inside this drapery being occupied by the three curtains, and producing, when seen from the audience, a perfectly-flat surface, it being impossible to distinguish the several curtains and drapery one from the other, even in the strongest light, owing to the fact that the material used is a black without luster, and hence cannot reflect rays of light falling upon the same. The actor places the metallic corset L upon her body and straps herself by means of the straps tightly to the central belt, which, in turn, is securely fastened to the end of the spindle K, a suitable dress or jacket covering the metallic corset. Now the actor may be raised and lowered by the before-mentioned winch I lifting the truck H, and she may be revolved by turning the crank-handle M, thus making it appear as if she were turning a somersault in mid-air. To cause her to move laterally, (from right to left or vice versa,) the frame D D' is moved upon its rail-track in the proper direction, which will cause the curtains T T' to follow and to wind upon and unwind from the respective rollers U U', as the case may be, so that no matter in what position the actor may be placed the background appears always the same. It will now be observed that by a compound vertical and horizontal movement of the two trucks the performer may be moved in every direction while suspended in mid-air, the illusion of which is not only perfectly mystifying, but also highly pleasing. To make this illusion still more perfect, the actor may leave her fixed position on the end of the spindle K at any time when standing upon the stage by the operator unscrewing the rod N, when she may step forward in a line coinciding with the center line of said spindle, and retracing her steps backward, when she will readily find her proper position on the spindle by means of the extension N' of said rod N guiding her to the end of said spindle. The spindle K, as well as the rods N N', are highly polished, and, since they will reflect the black color of the curtains only, will also appear black, and cannot therefore be recognized by the audience.

To keep the elevating truck H always in proper position upon the standard G, the frame I' has a laterally-projecting bar W, the forward end of which is provided with guide-rollers X, engaging a guide-bar Y, placed parallel with the standard G, as clearly shown in Fig. 2. Any other mechanism, however, may be employed for this purpose without departing from my invention.

Having thus fully described my invention, I claim as new and desire to secure to me by Letters Patent of the United States—

1. In devices to support actors in mid-air without visible means of support, the combination of a main frame with a movable frame having an elevating-truck and means for raising and lowering the same, said truck having a spindle provided with a suitable corset to encircle the performer, substantially as shown and described.

2. In devices of the class described, the combination, with a fixed main frame, of a movable frame having an elevating-truck and a winch, a spindle to which the actor is affixed, a curtain through which said spindle passes, and further curtains adapted to move with said movable frame, as and for the object stated.

3. In devices of the class described, the combination, with the main frame, of a movable frame having a winch and an elevating-truck, the spindle having its bearings in said truck and provided with a crank-handle, and the corset, as and for the purpose stated.

4. In devices of the class described, the combination, with the elevating-truck having bearings, as described, of a tubular spindle provided with a handle on one end and with a corset on the other end, said corset being removably affixed to the spindle by the screw-threaded rod, as and for the object stated.

5. In devices of the class described, the combination, with the fixed main frame, of the movable frame having guide-wheels, as described, the central standard, the elevating-truck with the bearings, the tubular spindle with the corset, and the winch on the movable truck, as and for the object set forth.

6. In devices of the class described, the combination, with the fixed and movable frames, of an elevating-truck and the curtains, the latter being adapted to follow the movements of the trucks, as and for the object set forth.

7. In devices of the class described, the combination, with the movable frame having the vertical members D D′, and top and bottom rails, of the rails O O′, brackets $d$, curtain rollers R R′, and the curtain Q, the latter having an aperture for the passage of the spindle K, as and for the purpose stated.

8. In devices of the class described, the combination, with the fixed and movable frames, of curtains having their rollers vertically arranged and adapted to move with the movable frame, as described, for the purpose stated.

9. In devices of the class described, the combination, with the fixed and movable frames, of the curtains T T′, having rollers U U′, the plates S S′, the curtain Q, and the rollers R R′, as set forth.

10. The combination, with the tubular shaft, of the corset, the screw-threaded rod engaging said corset, and the catch for engaging said rod with the crank, as set forth.

In testimony that I claim the foregoing as my invention I have hereto set my hand in presence of two subscribing witnesses.

WILL B. WOOD.

Attest:
 MICHAEL J. STARK,
 WM. O. STARK.